US012728571B2

(12) United States Patent
Jia et al.

(10) Patent No.: US 12,728,571 B2
(45) Date of Patent: Sep. 8, 2026

(54) ULTRA-HIGH MOLECULAR WEIGHT POLYETHYLENE ANTI-WEAR COMPOSITE MATERIAL MODIFIED BY MANGANESE PHOSPHATE NANOSHEET AND PREPARATION METHOD THEREOF

(71) Applicant: China Academy of Machinery Wuhan Research Institute of Materials Protection Co. Ltd., Wuhan (CN)

(72) Inventors: Dan Jia, Wuhan (CN); Tian Yang, Wuhan (CN); Tun Cai, Wuhan (CN); Haitao Duan, Wuhan (CN); Shengpeng Zhan, Wuhan (CN); Linlin Duan, Wuhan (CN); Yu Cheng, Wuhan (CN); Lian Liu, Wuhan (CN)

(73) Assignee: CHINA ACADEMY OF MACHINERY WUHAN RESEARCH INSTITUTE OF MATERIALS PROTECTION CO. LTD., Wuhan (CN)

( * ) Notice: Subject to any disclaimer, the term of this patent is extended or adjusted under 35 U.S.C. 154(b) by 80 days.

(21) Appl. No.: 18/774,884

(22) Filed: Jul. 16, 2024

(65) Prior Publication Data

US 2025/0100191 A1 Mar. 27, 2025

(30) Foreign Application Priority Data

Sep. 22, 2023 (CN) ......................... 202311240767.7

(51) Int. Cl.
*B29C 43/00* (2006.01)
*B29C 43/10* (2006.01)
(Continued)

(52) U.S. Cl.
CPC ............ *B29C 43/003* (2013.01); *B29C 43/10* (2013.01); *B29C 43/52* (2013.01); *C08K 3/32* (2013.01);
(Continued)

(58) Field of Classification Search
CPC .... C08L 2207/068; C08K 3/32; B29C 43/003
See application file for complete search history.

(56) References Cited

FOREIGN PATENT DOCUMENTS

CN 114479245 * 5/2022

OTHER PUBLICATIONS

Duan (2023), "Tribological properties and lubrication mechanism of manganese phosphate trihydrate as lubricant additives" (Year: 2023).*

* cited by examiner

*Primary Examiner* — Alison L Hindenlang
*Assistant Examiner* — Alexander A Wang

(57) ABSTRACT

A process of preparing an ultra-high molecular weight polyethylene (UHMWPE) anti-wear composite material modified by a manganese phosphate nanosheet is as follows: a trihydrate manganese phosphate nanosheet and UHMWPE powder are prepared firstly, and then the trihydrate manganese phosphate nanosheet is mechanically mixed with UHMWPE powder to form mixed powder; finally, the mixed powder is heated, molded, melted, and solidified using a hot-pressing method; and after cooling and demolding, the modified UHMWPE anti-wear composite material is obtained. Since the trihydrate manganese phosphate nanosheet can form a manganese phosphate film during a friction process, the manganese phosphate film can effectively reduce the deformation and tearing of friction surfaces of materials, thereby improving the anti-friction and anti-wear performance of UHMWPE. The friction coefficient, wear depth, and width of the UHMWPE anti-wear compos-
(Continued)

ite material under dry friction conditions are significantly improved.

11 Claims, 3 Drawing Sheets

(51) Int. Cl.
*B29C 43/52* (2006.01)
*C08K 3/32* (2006.01)
*C08L 23/06* (2006.01)
*B29K 103/04* (2006.01)
*B29K 105/00* (2006.01)

(52) U.S. Cl.
CPC ........ *C08L 23/06* (2013.01); *B29C 2043/106* (2013.01); *B29K 2023/06* (2013.01); *B29K 2103/04* (2013.01); *B29K 2105/251* (2013.01); *B29K 2995/0087* (2013.01); *B29K 2995/0088* (2013.01); *C08K 2003/321* (2013.01); *C08K 2201/011* (2013.01); *C08L 2203/30* (2013.01); *C08L 2207/068* (2013.01)

ULTRA-HIGH MOLECULAR WEIGHT POLYETHYLENE ANTI-WEAR COMPOSITE MATERIAL MODIFIED BY MANGANESE PHOSPHATE NANOSHEET AND PREPARATION METHOD THEREOF

TECHNICAL FIELD

The present disclosure relates to the technical field of polymer material technology and relates to a material used for manufacturing engineering equipment, and particularly to an ultra-high molecular weight polyethylene (UHMWPE) anti-wear composite material modified by a manganese phosphate nanosheet and a preparation method thereof.

BACKGROUND

Friction and wear are ubiquitous in our daily lives and have a significant impact on energy consumption, carbon dioxide emissions, and economic costs. Research on tribological issues in transportation industry, energy industry and other industries can not only effectively prolong the service life of mechanical equipment, reduce energy consumption and economic losses, but also reduce carbon dioxide emissions, providing new solutions for countries around the world to achieve carbon peak and carbon neutrality goals. In recent years, with the construction of various major engineering projects, higher requirements have been put forward for the functionality and reliability of various engineering equipment under harsh working conditions. Therefore, the research and development of high-performance polymer-based composite materials and their tribological properties are of great significance for the development and application of engineering equipment. Ultra-high molecular weight polyethylene (UHMWPE) has good self-lubricating properties, chemical inertness, and good mechanical properties, and has been widely used as friction pair components. However, the high wear of the UHMWPE limits its application in the field of the engineering equipment, and further improvement of the UHMWPE is needed. Traditional layered lubricants such as molybdenum disulfide and graphite have excellent lubrication performance due to their interlayer-gliding effects. Manganese phosphate is a widely used chemical raw material and is an important intermediate of other materials. Manganese phosphate can be used as a phosphating agent for the phosphating treatment of steel products, which has a good anti-rust effect. Manganese phosphate is also used as a lubricating-protection layer for various weapons or large-scale equipment. The layered manganese phosphate film has excellent lubrication performance and thermal resistance. Current research on the manganese phosphate mainly focuses on fields such as phosphating agents and precursors of lithium manganese phosphate as a positive electrode material for lithium-ion batteries. There have been no systematic reports on the manganese phosphate used as a filler for polymer composite materials to study the tribological properties of the composite materials.

SUMMARY

The present disclosure provides an UHMWPE anti-wear composite material modified by a manganese phosphate nanosheet and a preparation method thereof. The composite material of the present disclosure has excellent anti-wear performance, which greatly improves the tribological properties of friction pair materials and prolongs service lives of friction pair materials used in engineering equipment under harsh working conditions.

Specifically, the UHMWPE anti-wear composite material of the present disclosure is prepared by UHMWPE as a matrix material and a trihydrate manganese phosphate nanosheet as a filler material. A process of preparing the UHMWPE anti-wear composite material is as follows: firstly, the trihydrate manganese phosphate nanosheet is prepared, and then the trihydrate manganese phosphate nanosheet is mechanically mixed with UHMWPE powder evenly to form mixed powder; finally, the mixed powder is heated, molded, melted, and solidified using a hot-pressing method; followed by demolding after cooling, the modified UHMWPE anti-wear composite material is obtained. The present disclosure utilizes the trihydrate manganese phosphate nanosheet to form a manganese phosphate film with certain lubricity and heat resistance during a friction process, which can effectively reduce the deformation and tearing of the friction surface of the material, thereby improving the anti-friction and anti-wear performance of the UHMWPE. The friction coefficient, wear depth (also referred to as abrasion depth), and wear width (also referred to as abrasion width) of the UHMWPE anti-wear composite material under dry friction conditions are significantly reduced. When the UHMWPE anti-wear composite material is used as a friction material for motion pair components, the reliability and service lives of the motion pair components can be greatly improved.

Technical solutions adopted by the present disclosure to achieve the above purpose are as follows.

The present disclosure provides a UHMWPE anti-wear composite material modified by a trihydrate manganese phosphate nanosheet, which is prepared by UHMWPE and trihydrate manganese phosphate.

In an embodiment, the trihydrate manganese phosphate has a two-dimensional nanosheet layered structure.

The UHMWPE and the trihydrate manganese phosphate nanosheet described in the present disclosure are both powdery. Firstly, a divalent manganese salt solution is added to an alkaline buffer solution for a complete reaction to obtain a precipitate, and then the precipitate is separated to obtain the trihydrate manganese phosphate nanosheet. Then, the UHMWPE powder and the fully dried trihydrate manganese phosphate nanosheet powder are mechanically mixed to obtain mixed powder, and the mixed powder is solidified by a hot press machine to form an anti-friction and anti-wear polymer material (i.e., the UHMWPE anti-wear composite material) for engineering equipment. Corresponding molds are used to process the UHMWPE anti-wear composite material to obtain components with required shapes.

The present disclosure further provides a preparation method for the UHMWPE anti-wear composite material, which includes:

- step 1: preparing trihydrate manganese phosphate nanosheet powder;
- step 2: weighting UHMWPE powder and the trihydrate manganese phosphate nanosheet powder;
- step 3: mixing the UHMWPE powder and the trihydrate manganese phosphate nanosheet powder obtained in the step 2 evenly to obtain mixed powder; and
- step 4: placing the mixed powder in a mold, using the hot press machine to pre-press the mixed powder in the mold, solidifying the mixed powder in the mold, and demolding after cooling, so as to obtain the UHMWPE anti-wear composite material.

In an embodiment, a process of preparing the trihydrate manganese phosphate nanosheet includes:

adding a divalent manganese salt solution to an alkaline buffer solution to obtain a reaction solution; performing ultrasonic treatment on the reaction solution, standing the reaction solution after the ultrasonic treatment at the room temperature for a period of time; after a complete reaction of the reaction solution, separating a precipitate from the reaction solution, and fully drying the precipitate to obtain the trihydrate manganese phosphate nanosheet.

In an embodiment, the alkaline buffer solution is prepared by mixing a disodium hydrogen phosphate solution and a sodium dihydrogen phosphate solution with a volume ratio in a range of 60:40 to 80:20.

In an embodiment, the divalent manganese salt solution is any one or a combination of a manganese sulfate solution, a manganese chloride solution, and a manganese nitrate solution.

In an embodiment, the preparation method includes: weighing a certain amount of the trihydrate manganese phosphate nanosheet powder and the UHMWPE powder according to a weight ratio, using a planetary ball mill to mechanically mix the trihydrate manganese phosphate nanosheet powder and the UHMWPE powder for 1 hour to 2 hours to obtain the mixed powder.

In an embodiment, the mixed powder is dried in a drying oven at a temperature of 66 Celsius degrees (° C.) before the using the hot press machine to pre-press the mixed powder in the mold.

In an embodiment, in the step 4, after the mixed powder is dried, the mixed powder is placed into the mold. The mixed powder is pre-pressed in the mold for 3 times under a pre-pressing pressure of 20 MPa to 30 MPa while a duration of each time for pre-pressing the mixed powder is 3 minutes to 5 minutes. After the pre-pressing is completed, a temperature (i.e., preset temperature) of the mold is set to 160° C. to 180° C., the mold is heated until a temperature displayed on a temperature controller reaches a preset temperature, and the heating of the mold is stopped after the mold is insulated at the preset temperature for 2 hours to 3 hours. Then the mold is placed in air for natural cooling, when a temperature controller of the hot press machine is in a range of 108° C. to 112° C., the hot press machine applies a pressure of 10 MPa to 20 MPa on the mold and maintains the pressure of the mold. When the temperature of the mold is cooled to 98° C. to 102° C., the hot press machine applies a pressure of 30 MPa to 40 MPa to maintain the pressure of the mold. When the temperature of the mold is cooled to 88° C. to 92° C., the hot press machine applies a pressure of 70 MPa to 80 MPa to maintain the pressure of mold. When the temperature of the mold is cooled to 78° C. to 82° C., the hot press machine applies a pressure of 120 MPa to 150 MPa to maintain the pressure of mold. When the temperature of the mold is cooled to the room temperature, the hot press machine is depressurized and the UHMWPE anti-wear composite material is obtained by demolding the UHMWPE anti-wear composite material from the mold.

In an embodiment, the UHMWPE and the trihydrate manganese phosphate nanosheet are both powdery. The two types of powder materials are physically mixed to obtain the mixed powder firstly, then the mixed powder is melted and solidified by the hot press machine to obtain the UHMWPE anti-wear composite material used for engineering equipment.

In an embodiment, a content of the trihydrate manganese phosphate nanosheet in the UHMWPE anti-wear composite material is in a range of 5 weight percents (i.e., "percentage by weight" abbreviated as wt %) to 10 wt %.

In an embodiment, the content of the trihydrate manganese phosphate nanosheet in the UHMWPE anti-wear composite material is in a range of 5 wt % to 7 wt %.

The present disclosure has the following effects.

Firstly, in the present disclosure, the UHMWPE powder is selected as a matrix material, and the trihydrate manganese phosphate nanosheet is mixed with the UHMWPE powder to obtain the mixed powder, then the mixed powder is hot-pressed and formed to obtain the UHMWPE anti-wear composite material used for engineering equipment. As the manganese phosphate trihydrate nanosheet forms the manganese phosphate film with certain lubricity and heat resistance in the friction process, the deformation and tearing of the material on the friction surface are effectively reduced, thereby improving the anti-friction and anti-wear properties of the UHMWPE. When the content of the trihydrate manganese phosphate nanosheet is in a range of 5 wt % to 10 wt % and a content of the UHMWPE is in a range of 90 wt % to 95 wt %, a friction coefficient of the UHMWPE anti-wear composite material is minimum, the anti-wear effect of the UHMWPE anti-wear composite material is optimal, and the UHMWPE anti-wear composite material reduces material loss by more than 50%.

Secondly, under dry friction conditions, the UHMWPE anti-wear composite material exhibits significant changes in friction reduction compared to a pure UHMWPE material. Friction tests of the UHMWPE anti-wear composite material under the dry friction conditions show that the wear depth and the wear width of the UHMWPE anti-wear composite material are lower than those of the pure UHMWPE material, which indicates that the UHMWPE anti-wear composite material has better self-lubricating and wear resistance properties.

DETAILED DESCRIPTION OF EMBODIMENTS

To further technical means, effects, and purposes of the present disclosure, the following is a detailed explanation of specific implementation methods of a UHMWPE anti-wear composite material modified by a manganese phosphate nanosheet of the present disclosure, with reference drawings and embodiments. The following embodiments are only intended to provide a clearer explanation of technical solutions of the present disclosure and cannot be used to limit a protection scope of the present disclosure.

Comparative Embodiment 1

A process of hot-pressing and solidifying UHMWPE raw powder is as follows: 100 weight percents (wt %) of UHMWPE raw powder is weighted, and a planetary ball mill is configured to mechanically mill the UHMWPE raw powder for 1 hour to obtain UHMWPE powder. Then the UHMWPE powder is dried at 66 Celsius degrees (° C.) for 3 hours. Next, the UHMWPE powder undergoes a molding process, and the molding process is as follows: the UHMWPE powder after drying is placed into a mold, the UHMWPE powder is pre-pressed for 3 times under a pressure of 26 megapascals (MPa), and a duration of each time for pre-pressing the UHMWPE powder is 3 minutes; a temperature of the mold is preseted to 167° C., the mold is heated until a temperature displayed on a temperature controller reaches the preset temperature (i.e., 167° C.); after the mold is insulated for 2 hours, the heating of the mold is stopped; the mold is placed in air for natural cooling, when the temperature displayed on the temperature controller is 110° C., the hot press machine applies a pressure of 12 MPa on the mold and maintains the pressure of the mold; when the temperature of the mold is cooled to 100° C., the hot press machine applies a pressure of 37 MPa to maintain the pressure of the mold; when the temperature of the mold is cooled to 90° C., the hot press machine applies a pressure of 75 MPa to maintain the pressure of mold; and when the temperature of the mold is cooled to 80° C., the hot press machine applies a pressure of 142 MPa to maintain the pressure of mold until the temperature of the mold is cooled to the room temperature. After the temperature of the mold is cooled to the room temperature, the pure UHMWPE material is obtained by demolding the pure UHMWPE material from the mold.

Embodiment 1

Figure 1:
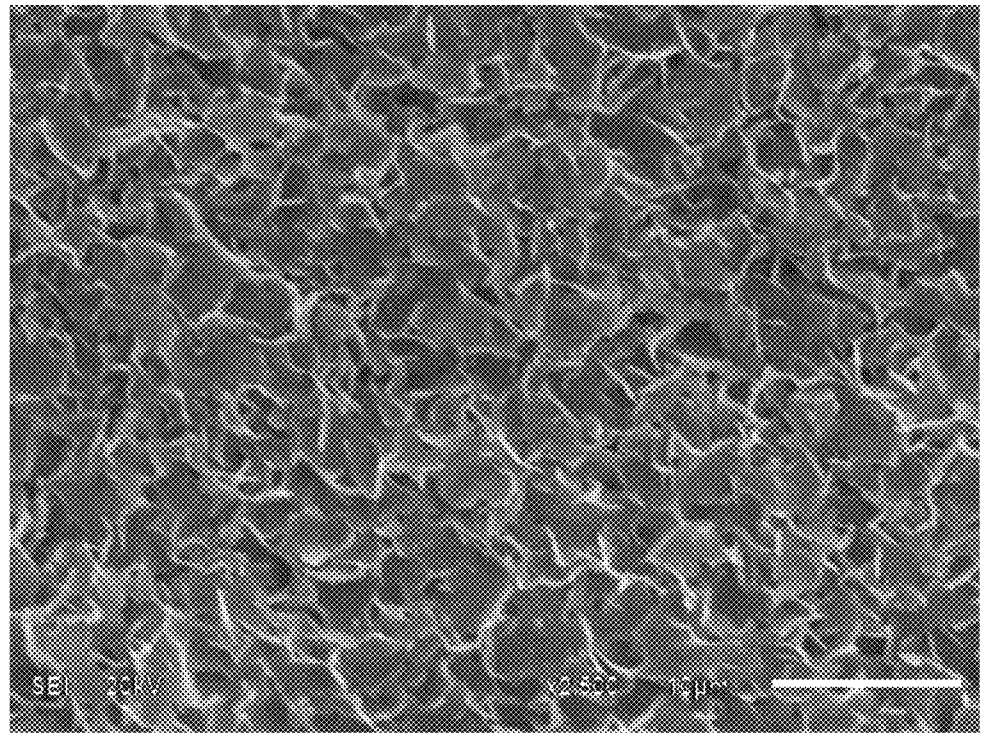
FIG. 1 illustrates a scanning electron microscopy image of a manganese phosphate trihydrate nanosheet prepared in embodiments 1-3 of the present disclosure.

Steps for preparing the UHMWPE anti-wear composite material in the embodiment includes step S1 and step S2. In the step S1, a trihydrate manganese phosphate nanosheet is prepared. Specifically, 28 milliliters (mL) of disodium hydrogen phosphate solution with a concentration of 0.2 moles per liter (mol/L) is mixed with 72 mL of sodium dihydrogen phosphate solution with a concentration of 0.2 mol/L to obtain a phosphate buffer solution with a concentration of 0.2 mol/L and a potential of hydrogen (pH) value of 7.2. Then, 0.5 mL of manganese sulfate solution with a concentration of 0.2 mol/L is added into the phosphate buffer solution (a ratio between manganese ions and phosphate ions is 1:200) to obtain a mixed solution. The mixed solution undergoes sonication treatment for 5 minutes. After standing the mixed solution for 48 hours, a precipitate is obtained by centrifugating the mixed solution, the precipitate is washed twice with distilled water, and the cleaned precipitate is dried in an oven with a temperature of 60° C. to obtain trihydrate manganese phosphate nanoflowers (i.e., the trihydrate manganese phosphate nanosheet) as shown in FIG. 1.

In the step S2, UHMWPE powder and the trihydrate manganese phosphate nanosheet powder are hot-pressed and solidified. Specifically, 5 wt % of the trihydrate manganese phosphate nanosheet and 95 wt % of UHMWPE raw powder are weighted. A planetary ball mill is configured to mechanically mill the UHMWPE raw powder and the trihydrate manganese phosphate nanosheet for 1 hour to obtain mixed powder. Then the mixed powder is dried at 64° C. for 3 hours. Next, the mixed powder undergoes a molding process, and the molding process is as follows: the mixed powder after drying is placed into a mold, the mixed powder is pre-pressed for 3 times under a pressure of 26 MPa, and a duration of each time for pre-pressing the mixed powder is 3 minutes; a temperature of the mold is preseted to 167° C., the mold is heated until a temperature displayed on a temperature controller reaches the preset temperature; after the mold is insulated for 2 hours, the heating of the mold is stopped; the mold is placed in air for natural cooling, when the temperature displayed on the temperature controller is 110° C., the hot press machine applies a pressure of 12 MPa on the mold and maintains the pressure of the mold; when the temperature of the mold is cooled to 100° C., the hot press machine applies a pressure of 37 MPa to maintain the pressure of the mold; when the temperature of the mold is cooled to 90° C., the hot press machine applies a pressure of 75 MPa to maintain the pressure of mold; and when the temperature of the mold is cooled to 80° C., the hot press machine applies a pressure of 142 MPa to maintain the pressure of mold until the temperature of the mold is cooled to the room temperature. After the temperature of the mold is cooled to the room temperature, the UHMWPE anti-wear composite material is obtained by demolding the UHMWPE anti-wear composite material from the mold.

Embodiment 2

Steps for preparing the UHMWPE anti-wear composite material in the embodiment includes step S1 and step S2. A preparation process of the trihydrate manganese phosphate nanosheet refers to step S1 of the embodiment 1.

In the step S2, UHMWPE powder and the trihydrate manganese phosphate nanosheet powder are hot-pressed and solidified. Specifically, 7 wt % of the trihydrate manganese phosphate nanosheet and 93 wt % of UHMWPE raw powder are weighted. A planetary ball mill is configured to mechanically mill the UHMWPE raw powder and the trihydrate manganese phosphate nanosheet for 1 hour to obtain mixed powder. Then the mixed powder is dried at 64° C. for 3 hours. Next, the mixed powder undergoes a molding process, and the molding process is as follows: the mixed powder after drying is placed into a mold, the mixed powder is pre-pressed for 3 times under a pressure of 26 MPa, and a duration of each time for pre-pressing the mixed powder is 3 minutes; a temperature of the mold is preseted to 167° C., the mold is heated until a temperature displayed on a temperature controller reaches the preset temperature; after the mold is insulated for 2 hours, the heating of the mold is stopped; the mold is placed in air for natural cooling, when the temperature displayed on the temperature controller is 110° C., the hot press machine applies a pressure of 12 MPa on the mold and maintains the pressure of the mold; when the temperature of the mold is cooled to 100° C., the hot press machine applies a pressure of 37 MPa to maintain the pressure of the mold; when the temperature of the mold is cooled to 90° C., the hot press machine applies a pressure of 75 MPa to maintain the pressure of mold; and when the temperature of the mold is cooled to 80° C., the hot press machine applies a pressure of 142 MPa to maintain the pressure of mold until the temperature of the mold is cooled to the room temperature. After the temperature of the mold is cooled to the room temperature, the UHMWPE anti-wear composite material is obtained by demolding the UHMWPE anti-wear composite material from the mold.

Embodiment 3

Steps for preparing the UHMWPE anti-wear composite material in the embodiment includes step S1 and step S2. A preparation process of the trihydrate manganese phosphate nanosheet refers to step S1 of the embodiment 1.

In the step S2, UHMWPE powder and the trihydrate manganese phosphate nanosheet powder are hot-pressed and solidified. Specifically, 10 wt % of the trihydrate manganese phosphate nanosheet and 90 wt % of UHMWPE raw powder are weighted. A planetary ball mill is configured to mechanically mill the UHMWPE raw powder and the trihydrate manganese phosphate nanosheet for 1 hour to obtain mixed powder. Then the mixed powder is dried at 64° C. for 3 hours. Next, the mixed powder undergoes a molding process, and the molding process is as follows: the mixed powder after drying is placed into a mold, the mixed powder is pre-pressed for 3 times under a pressure of 26 MPa, and a duration of each time for pre-pressing the mixed powder is 3 minutes; a temperature of the mold is preseted to 167° C., the mold is heated until a temperature displayed on a temperature controller reaches the preset temperature; after the mold is insulated for 2 hours, the heating of the mold is stopped; the mold is placed in air for natural cooling, when the temperature displayed on the temperature controller is 110° C., the hot press machine applies a pressure of 12 MPa on the mold and maintains the pressure of the mold; when the temperature of the mold is cooled to 100° C., the hot press machine applies a pressure of 37 MPa to maintain the pressure of the mold; when the temperature of the mold is cooled to 90° C., the hot press machine applies a pressure of 75 MPa to maintain the pressure of mold; and when the temperature of the mold is cooled to 80° C., the hot press machine applies a pressure of 142 MPa to maintain the pressure of mold until the temperature of the mold is cooled to the room temperature. After the temperature of the mold is cooled to the room temperature, the UHMWPE anti-wear composite material is obtained by demolding the UHMWPE anti-wear composite material from the mold.

Figure 2:
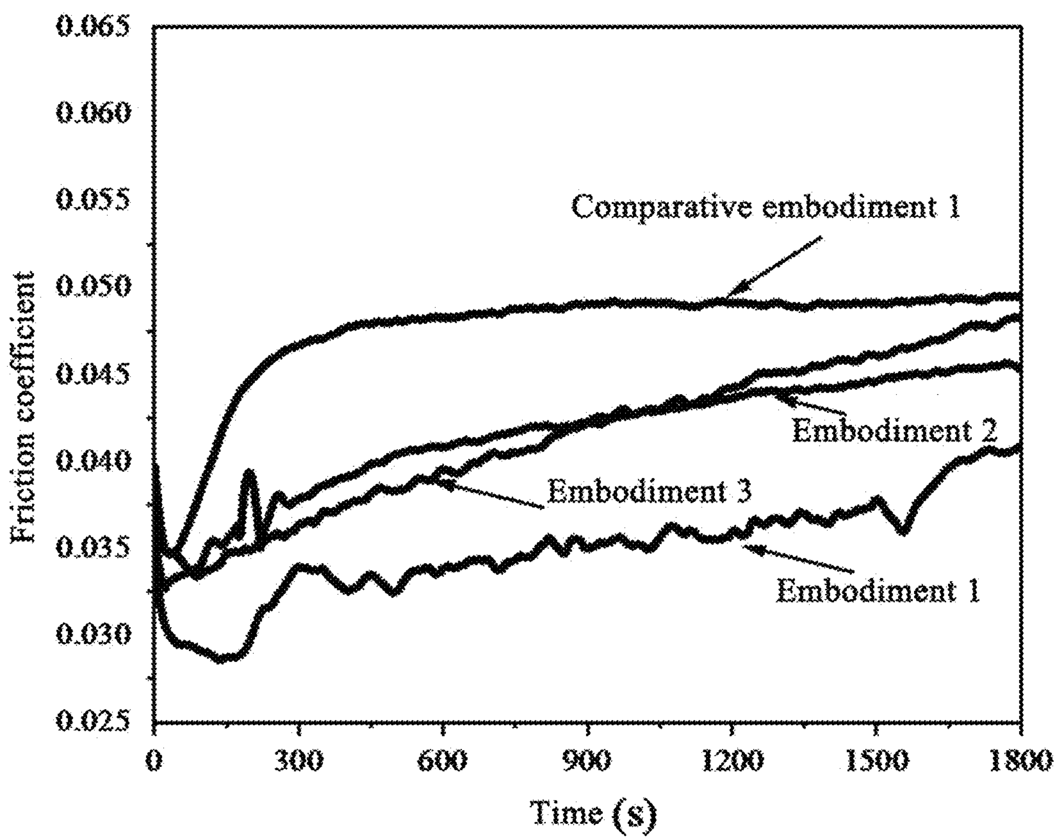
FIG. 2 illustrates a diagram showing a relationship between friction coefficient and friction time of UHMWPE anti-wear composite materials under a dry friction condition of the present disclosure. In the FIG. 2, a curve of comparative embodiment 1 represents a friction coefficient curve of a pure UHMWPE material used for engineering equipment, while curves of embodiments 1-3 represent friction coefficient curves of the UHMWPE anti-wear composite materials used for engineering equipment respectively.
Figure 3:
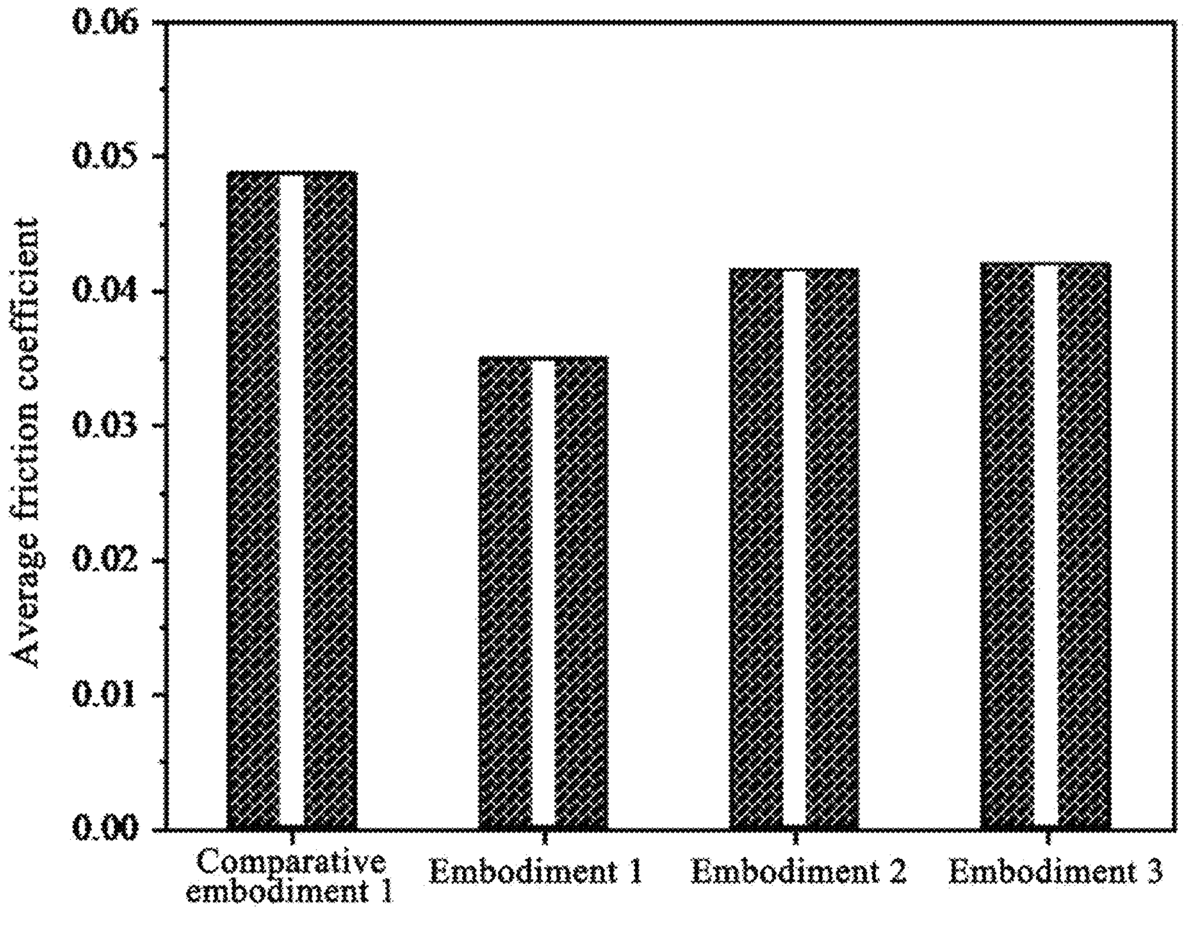
FIG. 3 illustrates a diagram showing average friction coefficients of the UHMWPE anti-wear composite materials prepared in the embodiments 1-3 and the pure UHMWPE material of the comparative embodiment 1 under dry friction conditions of the present disclosure.
Figure 4:
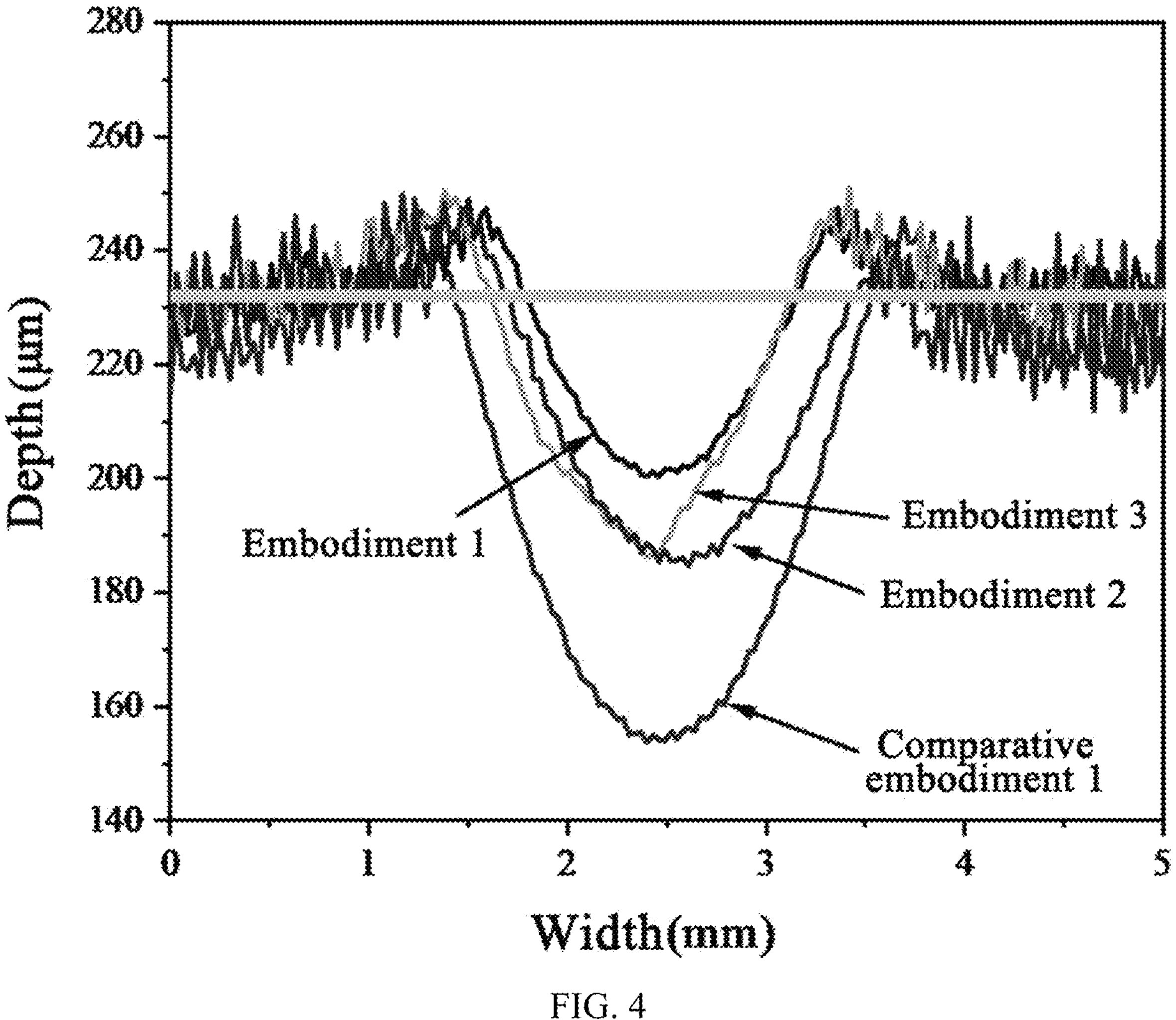
FIG. 4 shows a diagram showing a relationship among distribution ratios of the UHMWPE anti-wear composite materials, depths of wear marks, and widths of wear marks under the dry friction conditions of the present disclosure. In the FIG. 4, curves represent curves of the UHMWPE anti-wear composite materials with different compositions prepared in the comparative embodiment 1 and the embodiments 1-3, respectively.

Tribological properties of the UHMWPE composite materials (i.e., the pure UHMWPE material and the UHMWPE anti-wear composite materials) prepared by the above comparative embodiment 1 and the embodiments 1-3 are compared, and the comparative results are shown in FIGS. 2-4.

Frictional tests under dry friction conditions are performed on a pin-on-disc wear testing machine, each mating part of kinematic pair of the pin-on-disc wear testing machine is a steel ball with a diameter of 8 millimeters (mm), and the steel ball is made of GCr15 (GCr15 is an abbreviation for high-carbon chromium bearing steel in Chinese national standards) bearing steel. The working load is 100 Newton's (N), the speed is 0.66 m/s (i.e., the revolution speed is 300 r/min), the rotation radius is 21 mm, and the working time is 30 minutes.

As shown in FIGS. 2-4, by comparing the pure UHMWPE prepared in the comparative embodiment 1 with the UHMWPE anti-wear composite materials prepared in the embodiments 1-3, friction coefficients of the UHMWPE anti-wear composite materials are reduced, and a maximum reduction of friction coefficients is about 30%. Depths and widths of wear marks are also significantly reduced, and maximum reductions of the depths and widths are more than 50%. Since the trihydrate manganese phosphate nanosheet forms a manganese phosphate film with certain lubricity and heat resistance during a friction process, the manganese phosphate film can effectively reduce the deformation and tearing of friction surfaces of materials, thereby improving the anti-friction and anti-wear performance of UHMWPE. When a content of the trihydrate manganese phosphate nanosheet is in a range of 5 wt % to 10 wt % and a content of the UHMWPE powder is in a range of 90 wt % to 95 wt %, the UHMWPE anti-wear composite material of the present disclosure has optimal anti-friction and anti-wear performance under the dry friction conditions.

The above embodiments are only intended to illustrate the present disclosure and not to limit the present disclosure. Although the present disclosure has been described in detail with reference to embodiments, those skilled in the art should understand that any combinations, modifications, or equivalent replacements of the technical solutions of the present disclosure do not deviate from the spirit and scope of the technical solutions of the present disclosure, and these combinations, modifications, or equivalent replacements of the technical solutions should be covered within the scope of the claims of the present disclosure.

What is claimed is:

1. A preparation method for an ultra-high molecular weight polyethylene (UHMWPE) anti-wear composite material, comprising:

step 1: preparing trihydrate manganese phosphate nanosheet powder;

step 2: weighing UHMWPE powder and the trihydrate manganese phosphate nanosheet powder;

step 3: mixing the UHMWPE powder and the trihydrate manganese phosphate nanosheet powder obtained in the step 2 evenly to obtain mixed powder; and step 4: placing the mixed powder in a mold, using a hot press machine to pre-press the mixed powder in the mold, solidifying the mixed powder in the mold, and demolding after cooling, so as to obtain the UHMWPE anti-wear composite material; and wherein, during a friction process, a trihydrate manganese phosphate nanosheet of the UHMWPE anti-wear composite material is capable of migrating from a UHMWPE matrix to a friction surface to form a manganese phosphate film, reducing friction coefficient and wear.

2. The preparation method for the UHMWPE anti-wear composite material as claimed in claim 1, comprising: before the using the hot press machine to pre-press the mixed powder in the mold, drying the mixed powder in a drying oven at a temperature of 64 Celsius degrees (° C.).

3. The preparation method for the UHMWPE anti-wear composite material as claimed in claim 1, wherein in the step 4, a pre-pressing pressure of the hot press machine for the mixed powder is in a range of 20 megapascals (MPa) to 30 MPa; the mixed powder is pre-pressed for 2 times to 5 times under the pre-pressing pressure; and a duration of each time for pre-pressing the mixed powder is 3 minutes to 5 minutes.

4. The preparation method for the UHMWPE anti-wear composite material as claimed in claim 3, wherein in the step 4, a temperature of the solidifying the mixed powder is in a range of 160° C. to 180° C., and insulation time for the solidifying the mixed powder is in a range of 2 hours to 3 hours.

5. The preparation method for the UHMWPE anti-wear composite material as claimed in claim 4, wherein in the step 4, the solidifying the mixed powder in the mold, and demolding after cooling comprises:

heating the mold to a preset temperature and insulating the mold for 2 hours to 3 hours when solidifying the mixed powder, then stopping heating the mold; placing the mold in air for cooling; during the cooling, increasing a pressure of the hot press machine gradually as a temperature of the mold is decreased gradually until the pressure of the hot press machine is maintained in a range of 120 MPa to 150 MPa; when the mold is cooled to a room temperature, and depressurizing and demolding to obtain the UHMWPE anti-wear composite material.

6. The preparation method for the UHMWPE anti-wear composite material as claimed in claim 5, wherein in the step 4, the during the cooling, increasing a pressure of the hot press machine gradually as a temperature of the mold is decreased gradually until the pressure of the hot press machine is maintained in a range of 120 MPa to 150 MPa comprises:

when a temperature displayed on a temperature controller of the hot press machine is in a range of 108° C. to 112° C., applying a pressure of 10 MPa to 20 MPa on the mold and maintaining the pressure;

when the temperature of the mold is cooled to 98° C. to 102° C., applying a pressure of 30 MPa to 40 MPa to maintain the pressure;

when the temperature of the mold is cooled to 88° C. to 92° C., applying a pressure of 70 MPa to 80 MPa to maintain the pressure; and when the temperature of the mold is cooled to 78° C. to 82° C., applying the pressure of 120 MPa to 150 MPa to maintain the pressure until the temperature of the mold is cooled to the room temperature.

7. The preparation method for the UHMWPE anti-wear composite material as claimed in claim 1, wherein the preparing trihydrate manganese phosphate nanosheet powder comprises:

mixing 28 milliliters (mL) of disodium hydrogen phosphate solution at a concentration of 0.2 moles per liter (mol/L) with 72 mL of sodium dihydrogen phosphate solution at a concentration of 0.2 mol/L to obtain a phosphate buffer solution with a concentration of 0.2 mol/L and a potential of hydrogen (pH) value of 7.2;

adding 0.5 mL of manganese sulfate solution with a concentration of 0.2 mol/L to the phosphate buffer solution to obtain a mixed solution;

performing sonication treatment on the mixed solution for 5 minutes, followed by standing and centrifugating for 48 hours to obtain a precipitate; and washing the precipitate twice with distilled water, followed by drying in an oven with a temperature of 60° C. to obtain the trihydrate manganese phosphate nanosheet powder; and wherein a ratio between manganese ions and phosphate ions of the mixed solution is 1:200.

8. The preparation method for the UHMWPE anti-wear composite material as claimed in claim 7, wherein a content of the trihydrate manganese phosphate nanosheet in the UHMWPE anti-wear composite material is 5 weight percents (wt %), and a content of UHMWPE in the UHMWPE anti-wear composite material is 95 wt %.

9. The preparation method for the UHMWPE anti-wear composite material as claimed in claim 7, wherein a content of the trihydrate manganese phosphate nanosheet in the UHMWPE anti-wear composite material is 7 wt %, and a content of UHMWPE in the UHMWPE anti-wear composite material is 93 wt %.

10. The preparation method for the UHMWPE anti-wear composite material as claimed in claim 7, wherein a content of the trihydrate manganese phosphate nanosheet in the UHMWPE anti-wear composite material is 10 wt %, and a content of UHMWPE in the UHMWPE anti-wear composite material is 90 wt %.

11. The preparation method for the UHMWPE anti-wear composite material as claimed in claim 8, wherein the step 4 specifically comprises:

drying the mixed powder in a drying oven at a temperature of 64° C. for 3 hours;

placing the mixed powder after drying into the mold, followed by pre-pressing for 3 times using the hot press machine under a pressure of 26 MPa; wherein a duration of each time for pre-pressing the mixed powder is 3 minutes;

solidifying the mixed powder after pre-pressing in the mold by heating the mold to a preset temperature of 167° C. and insulating the mold for 2 hours, then stopping heating the mold;

placing the mold in air for cooling; during the cooling, increasing a pressure of the hot press machine gradually as a temperature of the mold is decreased gradually until the pressure of the hot press machine is maintained at 142 MPa, specifically:

when a temperature displayed on a temperature controller of the hot press machine is 110° C., applying a pressure of 12 MPa on the mold and maintaining the pressure;

when the temperature of the mold is cooled to 100° C., applying a pressure of 37 MPa to maintain the pressure;

when the temperature of the mold is cooled to 90° C., applying a pressure of 75 MPa to maintain the pressure; and when the temperature of the mold is cooled to 80° C., applying the pressure of 142 MPa to maintain the pressure until the temperature of the mold is cooled to the room temperature;

depressurizing and demolding to obtain the UHMWPE anti-wear composite material when the mold is cooled to a room temperature.

* * * * *